United States Patent
Sharma

(10) Patent No.: US 7,498,690 B2
(45) Date of Patent: Mar. 3, 2009

(54) SYSTEM AND METHOD FOR REGULATING POWER IN A MULTIPLE-OUTPUT SWITCHING CONVERTER

(75) Inventor: Anmol Sharma, Freising (DE)

(73) Assignee: Texas Instruments Incorporated, Dallas, TX (US)

(*) Notice: Subject to any disclaimer, the term of this patent is extended or adjusted under 35 U.S.C. 154(b) by 374 days.

(21) Appl. No.: 11/290,063

(22) Filed: Nov. 30, 2005

(65) Prior Publication Data

US 2006/0114624 A1    Jun. 1, 2006

Related U.S. Application Data

(60) Provisional application No. 60/632,725, filed on Dec. 1, 2004.

(51) Int. Cl.
H02J 1/00 (2006.01)
H02J 3/00 (2006.01)
H02J 3/14 (2006.01)

(52) U.S. Cl. .......................... 307/38; 307/39
(58) Field of Classification Search ................. 307/31, 307/38–39
See application file for complete search history.

(56) References Cited

U.S. PATENT DOCUMENTS

| | | | |
|---|---|---|---|
| 5,793,191 A | 8/1998 | Elmore et al. | |
| 5,814,979 A | 9/1998 | Grimm | |
| 5,955,872 A | 9/1999 | Grimm | |
| 5,969,962 A | 10/1999 | Gabor | |
| 6,184,660 B1 | 2/2001 | Hatular | |
| 6,522,110 B1 * | 2/2003 | Ivanov | 323/267 |
| 6,791,397 B2 * | 9/2004 | Shimozono | 327/543 |
| 6,906,500 B2 | 6/2005 | Kernahan | |
| 6,906,502 B2 | 6/2005 | Kernahan et al. | |
| 6,909,266 B2 | 6/2005 | Kernahan et al. | |
| 6,911,809 B2 | 6/2005 | Kernahan | |
| 6,912,139 B2 | 6/2005 | Kernahan et al. | |
| 6,917,188 B2 | 7/2005 | Kernahan | |
| 6,946,753 B2 | 9/2005 | Kernahan et al. | |
| 6,961,015 B2 | 11/2005 | Kernahan et al. | |
| 6,965,220 B2 | 11/2005 | Kernahan et al. | |
| 6,977,447 B2 * | 12/2005 | May | 307/31 |
| 7,132,765 B2 * | 11/2006 | Premont et al. | 307/81 |
| 7,298,116 B2 * | 11/2007 | Sluijs | 323/222 |

* cited by examiner

Primary Examiner—Stephen W Jackson
Assistant Examiner—Carlos Amaya
(74) Attorney, Agent, or Firm—Steven A. Shaw; W. James Brady; Frederick J. Telecky, Jr.

(57) ABSTRACT

A system and method is provided for supplying power to multiple outputs in a switching converter. One embodiment of the present invention includes a multiple-output switching converter that may comprise a switch arrangement operative to couple and decouple a supply voltage to an inductor, and to couple and decouple a given output of a plurality of outputs to the inductor. The multiple-output switching converter may also comprise a reference current generator operative to generate a reference current corresponding to an aggregated error of the plurality of outputs. The multiple-output switching converter may also comprise a current sensing device operative to dynamically measure the current through the inductor. The multiple-output switching converter may further comprise a controller that controls the switch arrangement to couple the supply voltage to the inductor during an inductor charge period and decouple the supply voltage from the inductor during an inductor discharge period. The inductor charge period may be based on an amount of time for the current through the inductor to be substantially equal to the reference current.

18 Claims, 3 Drawing Sheets

US 7,498,690 B2

SYSTEM AND METHOD FOR REGULATING POWER IN A MULTIPLE-OUTPUT SWITCHING CONVERTER

CROSS REFERENCE TO RELATED APPLICATIONS

The present application claims the benefit of U.S. Provisional Patent Application Ser. No. 60/632,725, filed Dec. 1, 2004, entitled CURRENT MODE CONTROL OF A SINGLE INDUCTOR MULTIPLE OUTPUT SWITCHING CONVERTER, and which is incorporated herein by reference.

TECHNICAL FIELD

This invention relates to electronic circuits, and more specifically to a system and method for regulating power in a multiple-output switching converter.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. Switching converters have been implemented as an efficient mechanism for providing a regulated output. One such type of converter is known as a switching regulator or switching converter, which controls the flow of power to a load by controlling an on and off duty-cycle of one or more switches coupled to the load. Many different classes of switching converters exist today.

One type of switching converter employs a single inductor and multiple outputs, such that energy of the inductor can be switched between the multiple outputs to regulate each of the outputs. This type of switching converter is advantageous in that multiple outputs of varying magnitudes can be provided without the need of multiple inductors. To ensure reliable performance, switching converter designers often include voltage sensing feedback to monitor the voltage output of a switching converter. Such feedback, however, can be costly and can require a number of additional circuit components, particularly for a switching converter with multiple outputs.

SUMMARY

One embodiment of the present invention includes a multiple-output switching converter that may comprise a switch arrangement operative to couple and decouple a supply voltage to an inductor, and to couple and decouple a given output of a plurality of outputs to the inductor. The multiple-output switching converter may also comprise a reference current generator operative to generate a reference current corresponding to an aggregated error of the plurality of outputs. The multiple-output switching converter may also comprise a current sensing device operative to dynamically measure the current through the inductor. The multiple-output switching converter may further comprise a controller that controls the switch arrangement to couple the supply voltage to the inductor during an inductor charge period and decouple the supply voltage from the inductor during an inductor discharge period. The inductor charge period may be based on an amount of time for the current through the inductor to be substantially equal to the reference current.

Another embodiment may include a method for regulating a multiple-output switching converter. The method comprises determining error associated with each of the plurality of outputs and determining a proportion of error for each of the plurality of outputs relative to an aggregated error of the plurality of outputs. The method also comprises providing an inductor discharge current from an inductor over a given inductor discharge period to each of the plurality of outputs for an amount of time that is in proportion to the error of the respective output relative to the aggregated error.

Another embodiment may include a multiple-output switching converter that may comprise a means for supplying an inductor discharge current of an inductor to a plurality of outputs of the switching converter during an inductor discharge period of a given switching cycle. The multiple-output switching converter that may also comprise a means for determining error associated with each of the plurality of outputs. The multiple-output switching converter that may further comprise a means for switching the inductor discharge current to a given one of the plurality of outputs for a given discharge period based on an output having an error that is greatest in magnitude relative to the remaining outputs of the plurality of outputs.

DETAILED DESCRIPTION

The present invention relates to electronic circuits, and more specifically to a system and method for regulating power in a multiple-output switching converter. In one aspect of the invention, a plurality of voltage error signals associated with respective outputs of a multiple-output switching converter are aggregated together to generate an aggregated error signal. A reference current can be dynamically generated based on the aggregated error signal. In a given inductor charge period, an inductor charge current can generated in an inductor until the current through the inductor is substantially equal to the reference current. In an inductor discharge period, the inductor discharge current is applied to one or more outputs. An aggregated error signal reduces the number of switching in a given time period reducing switch loss compared to other converters. Additionally, the control loop design is simplified by employing a single error signal for multiple outputs.

Figure 1:
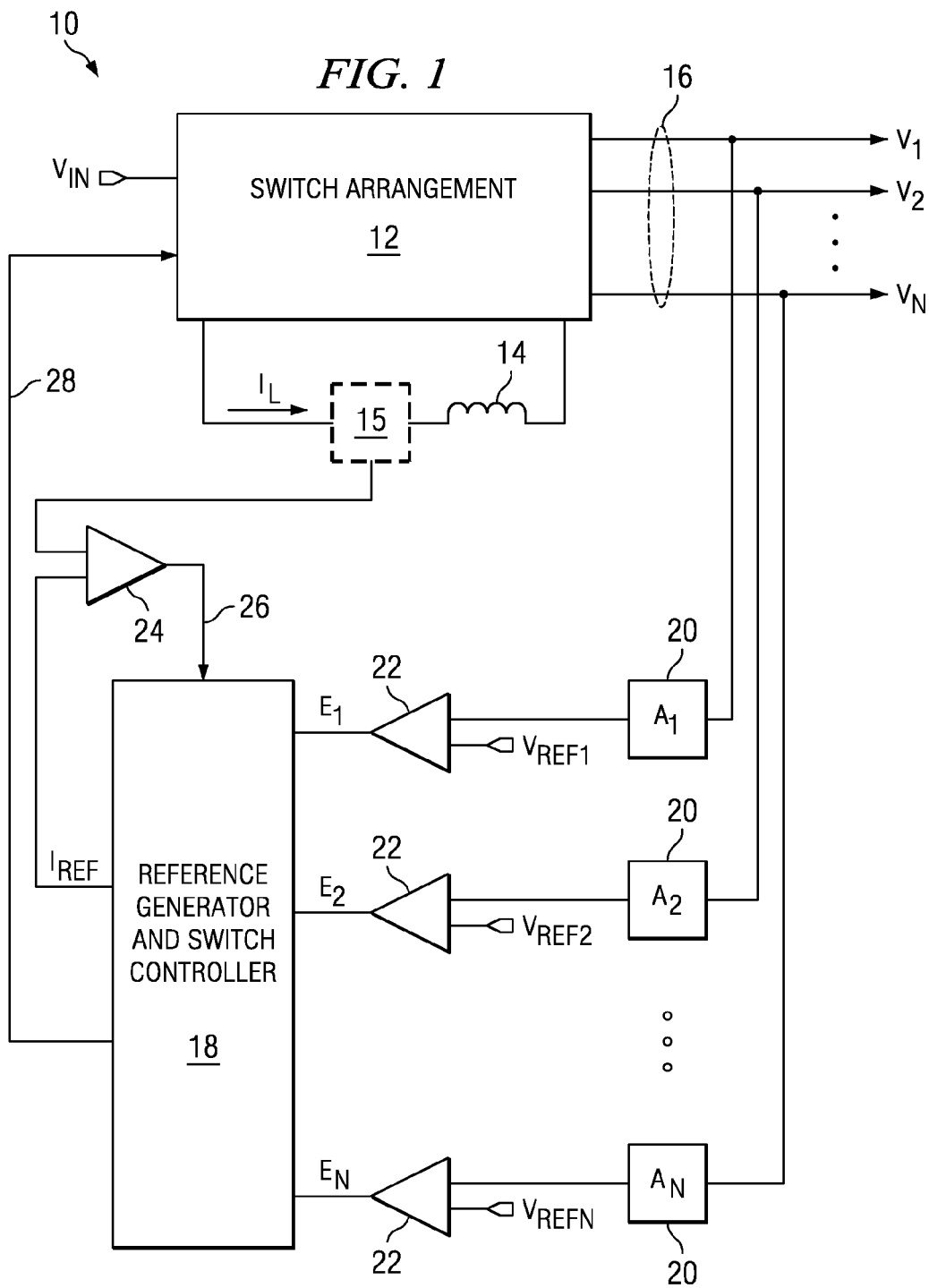
FIG. 1 illustrates an example of a multiple-output switching converter in accordance with an aspect of the invention.

FIG. 1 illustrates an example of a multiple-output switching converter 10 in accordance with an aspect of the invention. The switching converter 10 includes a switch arrangement 12 and an inductor 14. The switch arrangement 12 switches a supply voltage $V_{IN}$ to supply an inductor current $I_L$ through the inductor 14 during a charge period of a switching cycle. It is to be understood that the switching converter 10 can be any type of switching converter configuration, such as, for example, a boost converter, a buck converter, or a buck-boost converter. Accordingly, the inductor 14 is capable of maintaining the inductor current $I_L$ throughout the switching cycle, such that in a given switching cycle, the inductor current $I_L$ increases during the charge period, which includes the input of the inductor 14 being switched to the supply voltage $V_{IN}$, and dissipates during a discharge period, which includes the supply voltage $V_{IN}$ being decoupled from the input of the inductor 14. It is to be understood that the duration of the switching cycle may be fixed. However, in a given fixed switching cycle, the charge period of the inductor current $I_L$ and the discharge period of inductor current $I_L$ may not be uniform.

The switch arrangement 12 also switches the inductor current $I_L$ between a plurality N of outputs 16, whereas N is a positive integer greater than or equal to 2. Accordingly, each of the plurality of outputs 16 can supply a respective output voltage $V_1$-$V_N$, such that each of the respective output voltages $V_1$-$V_N$ can be of a same or different magnitude relative to each other. As an example, one or more of the plurality of outputs 16 can have a respective output voltage that can have a magnitude that differs relative to others of the plurality of outputs 16 by a factor of approximately 10. Each of the plurality of outputs 16 can be used to supply the respective output voltage $V_1$-$V_N$ to a given load.

Each of the output voltages $V_1$-$V_N$ are input to a respective gain amplifier 20, labeled $A_1$-$A_N$, such that the amount of error of each of the output voltages $V_1$-$V_N$ can be scaled relative to each other. Each of the amplified output voltages $V_1$-$V_N$ are input to a respective error amplifier 22. Each of the respective error amplifiers also receives a respective input of a reference voltage $V_{REF1}$-$V_{REFN}$. As an example, the gain amplifiers 20 could scale the output voltages $V_1$-$V_N$ of the plurality of outputs 16 to substantially similar output levels, such that the reference voltages $V_{REF1}$-$V_{REFN}$ could all be substantially equal, and a single reference voltage can be employed. As an alternative example, the gain amplifiers could produce a unity gain, such that the reference voltages $V_{REF1}$-$V_{REFN}$ could each respectively represent a desired output voltage of each of the plurality of outputs 16. The error amplifiers 22 each generate voltage error signals $E_1$-$E_N$ based on the received outputs from the gain amplifiers 20 and the corresponding reference voltages $V_{REF1}$-$V_{REFN}$.

In accordance with an aspect of the invention, a reference generator and switch controller 18 generates an aggregated error signal by summing the voltage error signals $E_1$-$E_N$, as will be further demonstrated in the example of FIG. 4 below. The reference generator and switch controller 18 employs the aggregated error signal to generate a reference current $I_{REF}$. It is to be understood that, as the magnitude of the voltage error signals $E_1$-$E_N$ may vary from one switching cycle to the next, the magnitude of the aggregated error signal, and thus the value of the reference current $I_{REF}$, may also vary from one switching cycle to the next. Hence, the reference current $I_{REF}$ is dynamically generated. It is also to be understood that the reference current $I_{REF}$ may also be based on the magnitude of the inductor current $I_L$, as will be described further below with regard to FIG. 4.

The reference current $I_{REF}$ is output from the reference generator and switch controller 18 and input to a current comparator 24. The current comparator 24 also receives the inductor current $I_L$ as an input from a current sensing circuit 15. It is to be understood that the current sensing circuit 15 can be a variety of different types of current sensing circuit known in the art, such as, for example, a current mirror, resistor arrangement, or voltage-to-current conversion circuit. The current comparator 24 senses the magnitude of the inductor current $I_L$ relative to the reference current $I_{REF}$ and outputs a cutoff signal 26 to the reference generator and switch controller 18 upon the inductor current $I_L$ being substantially equal to the reference current $I_{REF}$. The reference generator and switch controller 18 can utilize the cutoff signal 26 to control the timing of the switch arrangement 12 via a control signal 28. Accordingly, the charge period of the inductor current $I_L$ flowing through the inductor 14 can vary from one switching cycle to the next. Therefore, in accordance with an aspect of the invention, the reference generator and switch controller 18 employs current sensing to control the amount of time that the inductor 14 is switched to the supply voltage $V_{IN}$, thus controlling the magnitude of the inductor current $I_L$ being supplied as an inductor discharge current to the plurality of outputs 16.

The control signal 28 is also used to control the switching of the inductor current $I_L$ to the plurality of outputs 16. The reference generator and switch controller 18 can monitor each of the voltage error signals $E_1$-$E_N$ and control the amount of current that each of the corresponding plurality of outputs 16 receives to compensate for the respective amount of voltage error. For example, in accordance with an aspect of the invention, in a given inductor discharge period, the reference generator and switch controller 18 can sequentially switch the inductor current $I_L$ to each of the plurality of outputs 16 for an amount of time that is proportional to the magnitude of error of each of the respective output voltages $V_1$-$V_N$ relative to the aggregated error. As an alternative example, in accordance with an aspect of the invention, in a given inductor discharge period, the reference generator and switch controller 18 can switch the inductor current $I_L$ to a given one of the plurality of outputs 16 having the greatest magnitude of error.

As described above, the switching converter 10 in the example of FIG. 1 can aggregate the voltage error signals $E_1$-$E_N$ to generate the aggregated error signal and generate the reference current $I_{REF}$ based on the aggregated error signal. The switching converter 10 can therefore control the respective output voltages $V_1$-$V_N$ with fewer circuit components, and thus more cost effectively, than by voltage sensing at each of the respective outputs 16. In addition, by switching between the plurality of outputs 16 based on the relative magnitudes of the voltage error signals $E_1$-$E_N$, the switching converter 10 can regulate the output voltages $V_1$-$V_N$ with a simpler design that provides good cross-regulation performance.

Figure 2:
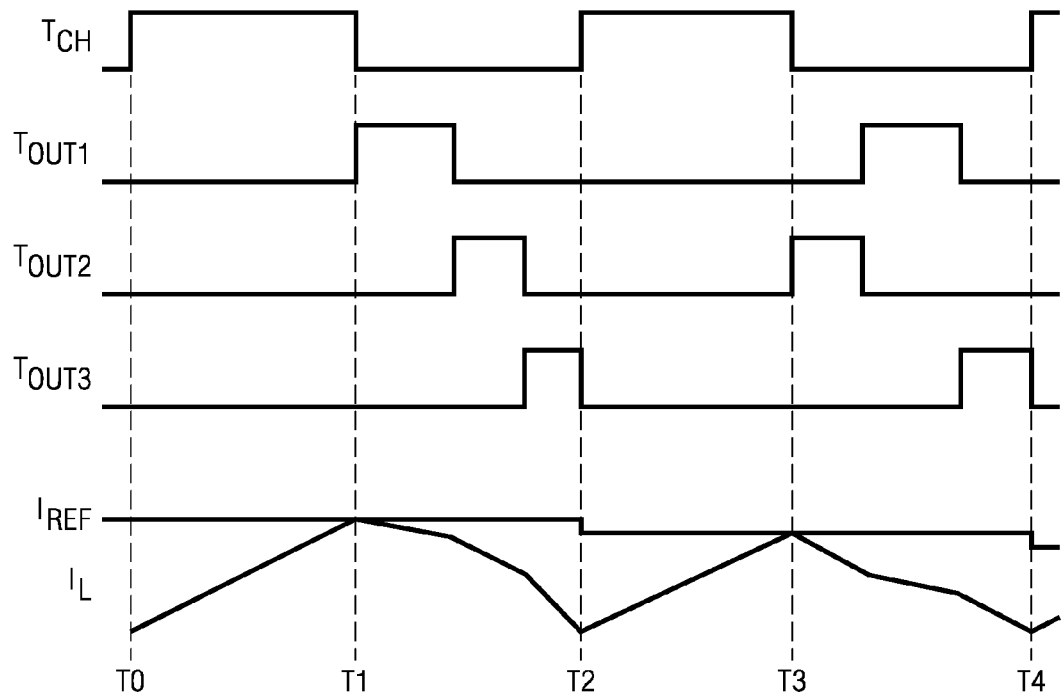
FIG. 2 illustrates an example of a timing diagram for a multiple-output switching converter in accordance with an aspect of the invention.

FIG. 2 illustrates an example of a timing diagram 50 of the operation of the multiple-output switching converter of FIG. 1. Accordingly for purposes of the following discussion regarding FIG. 2, it is to be assumed that the switching converter 10 includes three outputs 16, as will be demonstrated below. However, it is to be understood that the example of FIG. 1, and thus the example of FIG. 2, is not limited to three outputs, but can include any number in accordance with an aspect of the invention. It is to be further understood that the timing diagram 50 in the example of FIG. 2 is demonstrated as an ideal timing diagram, such that there are no timing and switching delays, for the purpose of simplicity, but that such delays may inherently exist in a given multiple-output switching converter.

The timing diagram 50 includes a charge period $T_{CH}$ and three output times $T_{OUT1}$, $T_{OUT2}$, and $T_{OUT3}$. The charge period $T_{CH}$ represents the supply voltage $V_{IN}$ being coupled to the inductor 14 when it is positive high (i.e., logic 1). The three output times $T_{OUT1}$, $T_{OUT2}$, and $T_{OUT3}$ each represent the inductor current $I_L$ being switched to the respective one of the three outputs 16 (i.e., the first output, the second output, the third output) when each of the respective output times $T_{OUT1}$, $T_{OUT2}$, and $T_{OUT3}$ are positive high. The timing diagram 50 includes a time T0, a time T2, and a time T4. The rising edges of the charge period $T_{CH}$ at each of times T0, T2, and T4 define the beginning of a charge period of a switching cycle. The falling edges of the charge period $T_{CH}$ at each of times T1 and T3 define the beginning of an inductor discharge period of a switching cycle. The duration of each switching cycle may be fixed. However, the charge period $T_{CH}$ and the inductor discharge period may be variable. The timing diagram 50 also includes a respective value for the reference current $I_{REF}$ generated by the reference generator and switch controller 18 during a given switching cycle and the magnitude of the inductor current $I_L$ flowing through the inductor 14.

At the time T0, the charge period $T_{CH}$ goes high, thus the supply voltage $V_{IN}$ is coupled to the inductor 14. Accordingly, the inductor current $I_L$ begins to increase. At a time T1, the inductor current $I_L$ becomes substantially equal to the reference current $I_{REF}$. Accordingly, at the time T1, the current comparator outputs the cutoff signal to the reference generator and switch controller 18. In response to receiving the cutoff signal at approximately the time T1, the reference generator and switch controller 18 decouples the inductor 14 from the supply voltage $V_{IN}$, and further begins sequentially switching the inductor current $I_L$ to the three outputs 16 during the inductor discharge period. The reference-generator and switch controller 18 may sequentially switch the three outputs 16 in a sequence based on a descending order of a relative magnitude of each of the three voltage error signals $E_1$, $E_2$, and $E_3$.

In the example of FIG. 2, the reference generator and switch controller 18 switches the inductor current $I_L$ to the first of the three outputs 16 during the time that $T_{OUT1}$ is positive high, to the second of the three outputs 16 during the time that $T_{OUT2}$ is positive high, and to the third of the three outputs 16 during the time that $T_{OUT3}$ is positive high. Accordingly, the voltage error signal $E_1$ corresponding to the first of the three outputs 16 is greater than the voltage error signal $E_2$ corresponding to the second of the three outputs 16, which is in turn greater than the voltage error signal $E_3$ corresponding to the third of the three outputs 16. In addition, the duration of time at which each of the respective three output times $T_{OUT1}$, $T_{OUT2}$, and $T_{OUT3}$ is positive high can be proportional to the magnitude of the respective voltage error signals $E_1$, $E_2$, and $E_3$ relative to the aggregated error signal. The timing diagram 50 also demonstrates that the inductor current $I_L$ dissipates with a negative slope that varies in magnitude relative to the magnitude of the output voltages $V_1$, $V_2$, and $V_3$ during the inductor discharge time.

At the time T2, a new charge period in a new switching cycle begins. As the inductor current $I_L$ is applied to the three outputs 16 during the previous discharge period beginning at the time T1, the respective voltage error signals $E_1$, $E_2$, and $E_3$ may have changed in response to the application of the inductor current $I_L$ to account for the respective magnitudes of voltage error. Accordingly, the reference generator and switch controller 18 may have a new aggregated error signal magnitude as a result of the addition of the new respective voltage error signals $E_1$, $E_2$, and $E_3$. Thus, the reference generator and switch controller 18 may generate a new value for the reference current $I_{REF}$ based on the new value for the aggregated error signal. In the example of FIG. 2, during the switching cycle beginning at time T2, the magnitude of the reference current $I_{REF}$ is demonstrated as reduced relative to the magnitude of the reference current $I_{REF}$ during the switching cycle beginning at the time T0.

At the time T2, $T_{CH}$ goes high, thus the inductor 14 is coupled to the supply voltage $V_{IN}$. Accordingly, the inductor current $I_L$ through the inductor 14 begins to increase. At a time T3, the inductor current $I_L$ becomes substantially equal to the reference current $I_{REF}$. Accordingly, at the time T3, the current comparator outputs the cutoff signal to the reference generator and switch controller 18, and thus beginning an inductor discharge period as the inductor current $I_L$ begins to dissipate as it is switched to the three outputs 16. It is to be understood that, in the example of FIG. 2, the duration of the charge period beginning at the time T2 may be shorter than the duration of the charge period beginning at the time T0 because the magnitude of the reference current $I_{REF}$ is smaller, as described above, and therefore it may take less time for the inductor current $I_L$ to reach the time T3 at which the inductor current $I_L$ becomes substantially equal to the reference current $I_{REF}$.

At the time T3, the reference generator and switch controller 18 may sequentially switch the three outputs 16 in a different sequence based on a descending order of a relative magnitude of each of the three voltage error signals $E_1$, $E_2$, and $E_3$. In the example of FIG. 2, at the time T3, it is demonstrated that the second output having a respective voltage error signal $E_2$ is switched first in the sequence, followed by the first output having a respective voltage error signal $E_1$, followed by the third output having a respective voltage error signal $E_3$. Accordingly, FIG. 2 demonstrates that, in the discharge period beginning at the time T3, the magnitude of the second voltage error signal $E_2$ corresponding to the second output is greater than the magnitude of the first voltage error signal $E_1$ corresponding to the first output, which is in turn greater than the third voltage error signal $E_3$ corresponding to the third output.

FIG. 2 also demonstrates that the durations of time at which each of the respective three output times $T_{OUT1}$, $T_{OUT2}$, and $T_{OUT3}$ is positive high is different in the discharge period beginning at the time T3 relative to the discharge period beginning at the time T1. It is to be understood that the durations of time at which each of the respective three output times $T_{OUT1}$, $T_{OUT2}$, and $T_{OUT3}$ is positive high is still proportional to the magnitude of the respective voltage error signals $E_1$, $E_2$, and $E_3$ relative to the aggregated error signal. However, the respective voltage error signals $E_1$, $E_2$, and $E_3$ may have different magnitudes in the discharge period beginning at the time T3 relative to the discharge period beginning at the time T1. Additionally, during the discharge period beginning at the time T3, the inductor current $I_L$ dissipates with a negative slope that could correspond in magnitude to the relative magnitude of the output voltages $V_1$, $V_2$, and $V_3$.

Figure 3:
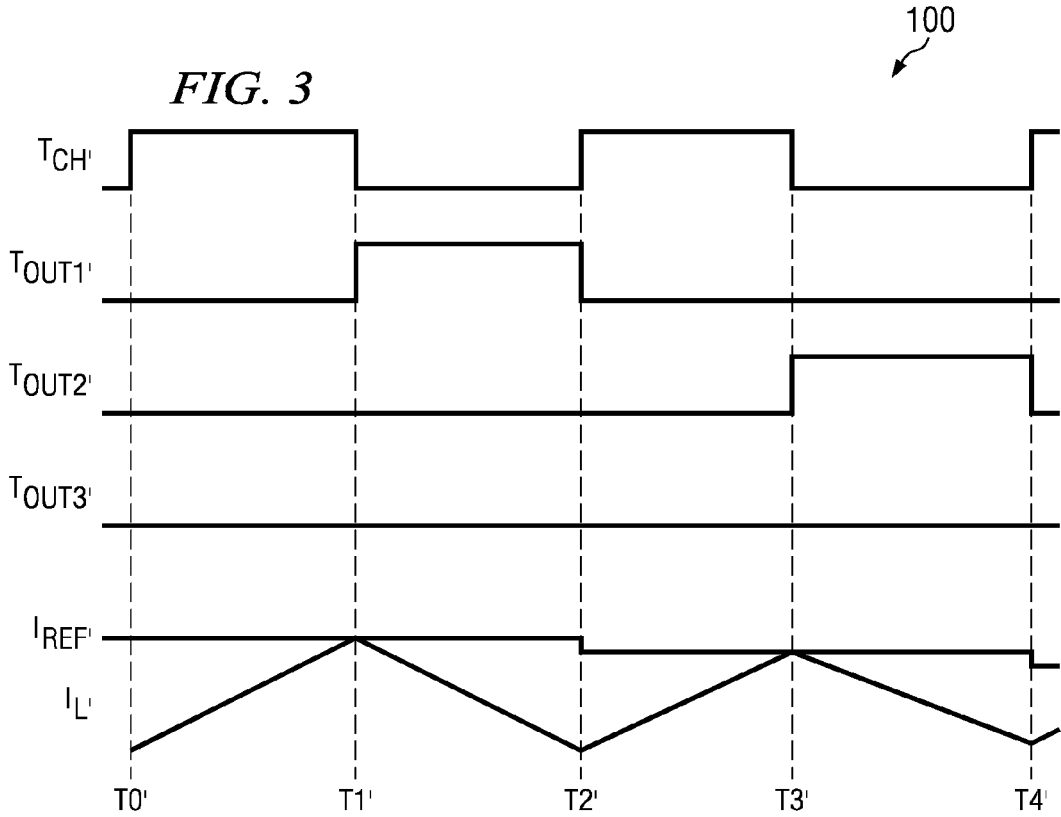
FIG. 3 illustrates another example of a timing diagram for a multiple-output switching converter in accordance with an aspect of the invention.

FIG. 3 demonstrates another example of a timing diagram 100 of the operation of the multiple-output switching converter 10 in the example of FIG. 1. Accordingly, for purposes of the following discussion regarding FIG. 3, it is to be assumed that the switching converter 10 includes three outputs 16, as will be demonstrated below. However, it is to be understood that the example of FIG. 1, and thus the example of FIG. 3, is not limited to three outputs, but can include any number in accordance with an aspect of the invention. It is to be further understood that the timing diagram 100 in the example of FIG. 3 is demonstrated as an ideal timing diagram, such that there are no timing and switching delays, for the purpose of simplicity, but that such delays may inherently exist in a given multiple-output switching converter.

The timing diagram 100 includes a charge period $T_{CH}'$ and three output times $T_{OUT1}'$, $T_{OUT2}'$, and $T_{OUT3}'$. The charge period $T_{CH}'$ represents the supply voltage $V_{IN}$ being coupled to the inductor 14 when it is positive high (i.e., logic 1). The three output times $T_{OUT1}'$, $T_{OUT2}'$, and $T_{OUT3}'$ each represent the inductor current $I_L'$ being switched to the respective one of the three outputs 16 (i.e., the first output, the second output, the third output) when each of the respective output times $T_{OUT1}'$, $T_{OUT2}'$, and $T_{OUT3}'$, are positive high. The timing diagram 100 includes a time T0', a time T2', and a time T4'. The rising edges of the charge period $T_{CH}'$ at each of times T0', T2', and T4' define the beginning of a charge period of a switching cycle. The falling edges of the charge period $T_{CH}'$ at each of times T1' and T3' define the beginning of an inductor discharge period of a switching cycle. The duration of each switching cycle may be fixed. However, the charge period $T_{CH}'$ and the inductor discharge period may be variable. The timing diagram 100 also includes a respective value for the reference current $I_{REF}'$ generated by the reference generator and switch controller 18 during a given switching cycle and the magnitude of the inductor current $I_L'$ flowing through the inductor 14.

At the time T0', the charge period $T_{CH}'$ goes high, thus the supply voltage $V_{IN}$ is coupled to the inductor 14. Accordingly, the inductor current $I_L'$ begins to increase. At a time T1', the inductor current $I_L'$ becomes substantially equal to the reference current $I_{REF}'$. Accordingly, at the time T1', the current comparator outputs the cutoff signal to the reference generator and switch controller 18. In response to receiving the cutoff signal at approximately the time T1', the reference generator and switch controller 18 decouples the inductor 14 from the supply voltage $V_{IN}$, and further switches the inductor current $I_L'$ to one of the three outputs 16 during the discharge period. The reference generator and switch controller 18 may switch the inductor current $I_L'$ to the one of the three outputs 16 that has the largest relative magnitude of the three voltage error signals $E_1$, $E_2$, and $E_3$.

In the example of FIG. 3, the reference generator and switch controller 18 switches the inductor current $I_L'$ to the first of the three outputs 16 during the time that $T_{OUT1}'$ is positive high, which is the entirety of the inductor discharge period beginning at the time T1'. The remainder of the three outputs (i.e., the second output and the third output) therefore do not receive any of the inductor current $I_L'$ during the inductor discharge period. Accordingly, the voltage error signal $E_1$ corresponding to the first of the three outputs 16 is greater in magnitude than both the voltage error signals $E_2$ and $E_3$. The timing diagram 100 also demonstrates that the inductor current $I_L'$ dissipates during the inductor discharge period with a negative slope that could correspond in magnitude to the relative magnitude of the output voltage $V_1$.

At the time T2', a new charge period in a new switching cycle begins. As the inductor current $I_L'$ is applied to the first of the three outputs 16 during the discharge period beginning at the time T1', the respective voltage error signal $E_1$ may have changed in response to the application of the inductor current $I_L'$ to account for the respective magnitude of error. Accordingly, the reference generator and switch controller 18 may have a new aggregated error signal as a result of the addition of the new respective voltage error signals $E_1$, $E_2$, and $E_3$. Thus, the reference generator and switch controller 18 may generate a new value for the reference current $I_{REF}'$ based on the new value for the aggregated error signal. In the example of FIG. 3, during the switching cycle beginning at the time T2' the magnitude of the reference current $I_{REF}'$ is demonstrated as reduced relative to the magnitude of the reference current $I_{REF}'$ during the switching cycle beginning at the time T0'.

At the time T2', $T_{CH}'$ goes high, thus the inductor 14 is coupled to the supply voltage $V_{IN}$. Accordingly, the inductor current $I_L'$ through the inductor 14 begins to increase during the charge period. At a time T3', the inductor current $I_L'$ becomes substantially equal to the reference current $I_{REF}'$. Accordingly, at the time T3', the current comparator outputs the cutoff signal to the reference generator and switch controller 18, and thus the inductor current $I_L'$ will begin to dissipate as it is switched to one of the three outputs 16. It is to be understood that, in the example of FIG. 3, the duration of the charge period beginning at the time T2' may be shorter than the duration of the charge period beginning at the time T0' because the magnitude of the reference current $I_{REF}'$ is smaller, as described above, and therefore it may take less time for the inductor current $I_L'$ to reach the time T3' at which the inductor current $I_L'$ becomes substantially equal to the reference current $I_{REF}'$.

At the time T3', the reference generator and switch controller 18 may switch the inductor current $I_L'$ to a different one of the three outputs 16 based on a relative magnitude of each of the three voltage error signals $E_1$, $E_2$, and $E_3$. In the example of FIG. 3, it is demonstrated that the second output having a respective voltage error signal $E_2$ is switched at the time T3'. Accordingly, FIG. 3 demonstrates that, in the switching cycle beginning at the time T2', the magnitude of the second voltage error signal $E_2$ corresponding to the second output is greater than the magnitude of the first voltage error signal $E_1$ corresponding to the first output, which is in turn greater than the third voltage error signal $E_3$ corresponding to the third output. Additionally, during the discharge period beginning at the time T3', the inductor current $I_L'$ dissipates with a negative slope that could correspond in magnitude to the relative magnitude of the output voltage $V_2$ of the second output.

In the alternative example of FIG. 3, the timing diagram 100 demonstrates that the inductor current $I_L'$ does not get switched to the third output at either of the discharge periods beginning at the respective times T1' and T3'. This is because the magnitude of the third voltage error signal $E_3$ is not greatest in magnitude of the three voltage error signals $E_1$, $E_2$, and $E_3$ at either of the times Ti' and T3'. Furthermore, the inductor current $I_L'$ may not get switched to the third output until the magnitude of either of the third voltage error signal $E_3$ is the greatest in magnitude of the three voltage error signals $E_1$, $E_2$, and $E_3$, and that the inductor current $I_L'$ may get switched to either of the first and second outputs again during the discharge period following the charge period beginning at the time T4' if the magnitude of the respective voltage error signals $E_1$ and $E_2$ is still greater than the magnitude of the third voltage error signal $E_3$.

Figure 4:
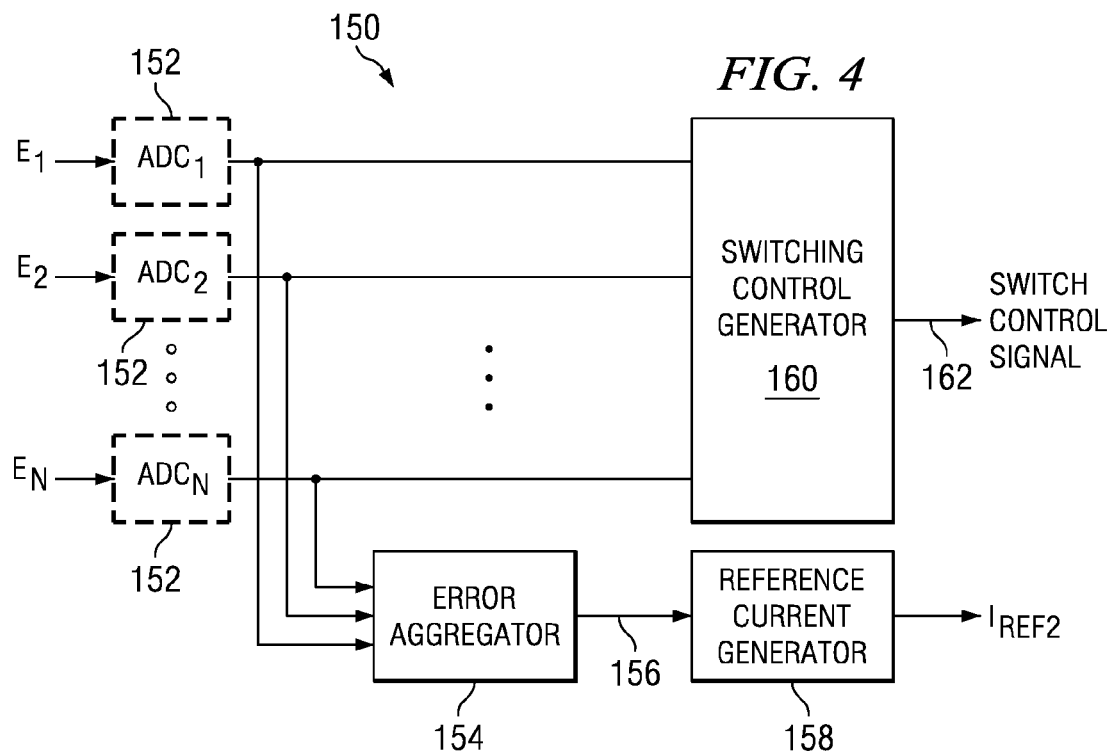
FIG. 4 illustrates an example of a control circuit for a multiple-output switching converter in accordance with an aspect of the invention.

FIG. 4 illustrates an example of a portion of a control circuit 150 for a multiple-output switching converter in accordance with an aspect of the invention. As an example, the portion of a control circuit 150 can be employed in the switching converter 10 in the example of FIG. 1. The portion of the control circuit 150 can include a plurality of analog-to-digital converters (ADCs) 152, respectively labeled $ADC_1$-$ADC_N$. Each of the ADCs 152 receives a respective analog error signal $E_1$-$E_N$ corresponding to an amount of error of an associated output of a switching converter. The ADCs 152 each convert the respective analog error signal $E_1$-$E_N$ to a digital representation of the same signal or to a digital error signal. The ADCs 152 are illustrated in dashed lines to provide an indication that the ADCs can be optional, such that control circuit 150 can perform slope control compensation in either the digital or analog domain employing a variety of different algorithms and/or circuitry to provide the desired functionality associated with the control circuit 150.

The portion of the control circuit 150 also includes an error aggregator 154. The error aggregator can be, for example, a digital or analog summation circuit. The error aggregator 154 receives each of the error signals $E_1$-$E_N$ as inputs, and outputs an aggregated error signal 156. The aggregated error signal 156 could represent a sum of the digital or analog error signals $E_1$-$E_N$, could represent a weighted sum of the digital or analog error signals $E_1$-$E_N$, or other aggregated combination of the digital or analog error signals $E_1$-$E_N$. The aggregated error signal 156 is input to a reference current generator 158. The reference current generator 158 may also employ a reference current from the previous switching cycle. For example, the reference current generator 158 may apply the aggregated error signal 156 and the reference current from the previous switching cycle to generate a reference current $I_{REF}$. The reference current generator 158 could include a current mode digital-to-analog converter (not shown), such that the generated reference current $I_{REF}$ is converted from a digital to an analog current signal. In the example of FIG. 4, the reference current $I_{REF}$ could represent a desired inductor current $I_L$ which accounts for a sum of the error present at each respective voltage output of the multiple-output switching converter.

The error signals $E_1$-$E_N$ are output from the respective one of the ADCs 152 or provided directly, for example via unity gain amplifiers (not shown) to a switching control generator 160. The switching control generator 160 may include comparison circuitry to compare relative error magnitudes of each of the error signals $E_1$-$E_N$. Having determined the relative magnitudes of each of the error signals $E_1$-$E_N$, the switching control generator 160 may determine switching information to control inductor current flow through a plurality of output switches associated with the plurality of outputs of the multiple-output switching converter. As an example, the switching information could include a switching sequence for each of the plurality of outputs to receive the inductor current $I_L$ flowing through an inductor based on the relative magnitudes of each of the error signals $E_1$-$E_N$. The switching information could also include a switching duration for each of the plurality of outputs to receive the inductor current IL in a given inductor discharge period, such that each of the switching durations is proportional to the magnitudes of each of the relative error signals $E_1$-$E_N$ relative to the aggregated error signal 156. As an alternative, the switching information could include which one of the plurality of outputs is to receive the inductor current $I_L$ in a given inductor discharge period based on the magnitudes of each of the relative error signals $E_1$-$E_N$. The switching control generator 160 outputs the switching information in a switch control signal 162, which could be input to an switching arrangement, such as demonstrated in FIG. 1.

Figure 5:
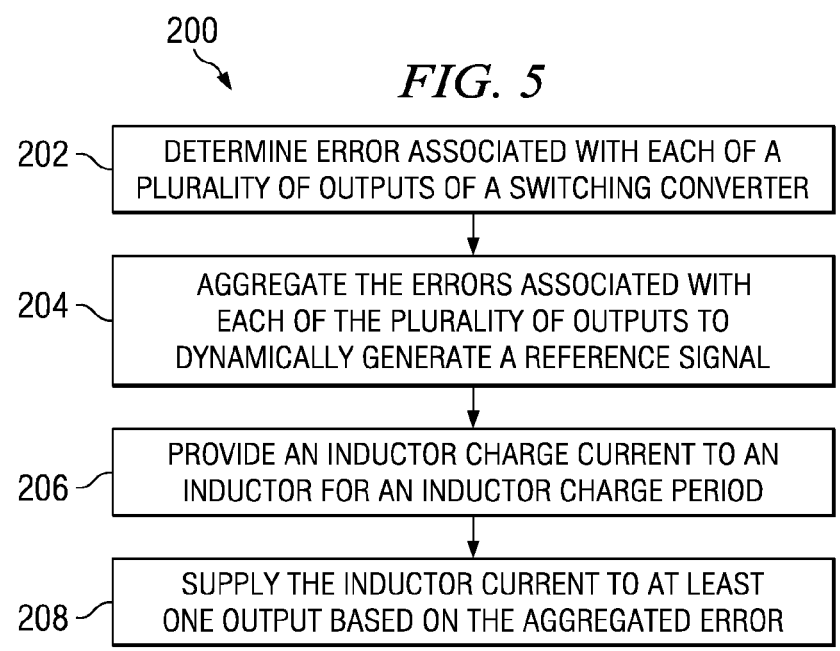
FIG. 5 illustrates a method for supplying power to multiple outputs in a switching converter in accordance with an aspect of the invention

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates a method 200 for supplying power to multiple outputs in a switching converter in accordance with an aspect of the invention. At 202, error associated with each of a plurality of outputs of a switching converter is determined. The error associated with each of a plurality of outputs could be generated as a plurality of voltage error signals corresponding, respectively, to each of the outputs. Each of the error signals could be converted to digital error signals or processed as analog error signals. At 204, the error associated with each of the plurality of outputs is aggregated to dynamically generate a reference signal. The reference signal could be a reference current that represents a desired inductor current flowing through an inductor for the switching converter during a given charge period. Accordingly, the reference signal could also be based on a reference current from a pervious switching cycle.

At 206, an inductor charge current is provided to an inductor for an inductor charge period. The inductor charge period could be a period of time of a switching cycle that the inductor is coupled to a supply voltage. The inductor charge period duration could be a period of time that it takes for the inductor current to become substantially equal to a reference current that is based on or equal to the reference signal. At 208, the inductor current is supplied to at least one output based on the aggregated error. The inductor current could be switched to the plurality of outputs. For example, the inductor current could be sequentially switched between the plurality of outputs, each of the plurality of outputs being switched for an amount of time that is proportional to a respective magnitude of error relative to the aggregated error. The sequential switching could occur in one discharge period, and could be sequentially switched based on a descending order of the magnitude of the error of each of the plurality of outputs. As an alternative example, the inductor current could be switched to a given one of the plurality of outputs during a discharge period based on a magnitude of the respective error associated with the given one of the plurality of outputs. In this example, the given one output to which the inductor current is switched may be the output that has the greatest magnitude of error.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A multiple-output switching converter for generating a plurality of outputs, said converter comprising:
    a switch arrangement operative to couple and decouple a supply voltage to an inductor, and to couple and decouple a given output of a said plurality of outputs to the inductor;
    a reference current generator operative to generate a reference current having a magnitude proportionate to an aggregated error of the plurality of outputs, wherein an error represents a difference of the output from a corresponding reference level and the aggregated error is based on the errors of the plurality of outputs;
    a current sensing device operative to dynamically measure the current through the inductor; and
    a controller that controls the switch arrangement to couple the supply voltage to the inductor during an inductor charge period and decouple the supply voltage from the inductor during an inductor discharge period, the inductor charge period being based on an amount of time for the current through the inductor to be substantially equal to the reference current.

2. The switching converter of claim 1, wherein the controller further comprises an error aggregator operative to sum error signals associated with respective outputs of the plurality of outputs to provide the aggregated error.

3. The switching converter of claim 2, wherein the reference current generator dynamically generates the reference current based on the sum of the error signals.

4. The switching converter of claim 1, further comprising a plurality of amplifiers for scaling output voltages of the plurality of outputs to substantially similar output levels, the output of respective amplifiers being coupled to respective comparators that compare the respective scaled output voltage to a same reference voltage.

5. The switching converter of claim 1, wherein the controller sequentially switches an inductor discharge current to each of the plurality of outputs during the inductor discharge period.

6. The switching converter of claim 5, wherein the inductor discharge current is provided to each of the plurality of outputs for a duration of time that is proportional to its respective error relative to the aggregated error.

7. The switching converter of claim 1, wherein the controller switches an inductor discharge current to one of the plurality of outputs at a given inductor discharge time period for a given switching cycle based on the given one of the plurality of outputs having the greatest magnitude of error.

8. The switching converter of claim 1, further comprising a plurality of analog-to-digital converters (ADCs), each of the plurality of ADCs being operative to convert an error signal associated with a given one of the plurality of outputs to a digital error signal, wherein the controller sums each of the plurality of digital error signals to generate the reference current.

9. The switching converter of claim 1, wherein the plurality of error signals are analog error signals and the controller sums each of the plurality of analog error signals to generate the reference current.

10. The switching converter of claim 1, further comprising a comparator that compares the reference current to the current through the inductor, and provides a signal to the controller upon the current through the comparator being substantially equal to the reference current.

11. The switching converter of claim 10, wherein the controller switches to an inductor discharge period upon the current through the comparator being substantially equal to the reference current.

12. A method for regulating a multiple-output switching converter designed to generate a plurality of outputs, the method comprising:
determining error associated with each of the plurality of outputs, wherein the error represents a difference of the output from a corresponding reference level;
determining a proportion of error for each of the plurality of outputs relative to an aggregated error of the plurality of outputs;
providing an inductor discharge current from an inductor over a given inductor discharge period to each of the plurality of outputs for an amount of time that is in proportion to the error of the respective output relative to the aggregated error; and
generating a reference signal based on the aggregated error, the reference signal being employed to determine a time period for providing an inductor charge current to the inductor for a given switching cycle.

13. The method of claim 12, wherein the reference signal is converted to a reference current.

14. The method of claim 13, further comprising:
comparing a current through the inductor to the reference current during an inductor charge period; and
switching to an inductor discharge period upon the monitored current being substantially equal to the reference current.

15. The method of claim 12, further comprising determining the aggregated error by summing the error associated with each of the plurality of outputs.

16. The method of claim 12, further comprising scaling output voltages of the plurality of outputs to substantially similar output levels and comparing the respective scaled output voltage to a same reference voltage.

17. A multiple-output switching converter designed to generate a plurality of outputs, said multiple-output switching converter comprising:
means for supplying an inductor discharge current of an inductor to a plurality of outputs of the switching converter during an inductor discharge period of a given switching cycle;
means for determining error associated with each of the plurality of outputs, wherein the error represents a difference of the output from a corresponding reference level;
means for switching the inductor discharge current to a given one of the plurality of outputs for a given discharge period based on an output having an error that is greatest in magnitude relative to the remaining outputs of the plurality of outputs; and
means for generating a reference signal based on an aggregated error signal that is an aggregation of error associated with each of the plurality of outputs, the error signal being employed to determine a time period for providing an inductor charge current to the inductor for a given switching cycle.

18. The switching converter of claim 17, further comprising:
means for measuring a current through the inductor; and
means for providing an inductor charge current to the inductor during an inductor charge period that is based on an amount of time for the measured current through the inductor to be substantially equal to a reference current based on the aggregated error signal.

\* \* \* \* \*